(12) United States Patent
Pop

(10) Patent No.: US 7,251,058 B2
(45) Date of Patent: Jul. 31, 2007

(54) METHOD FOR GENERATING CUSTOMIZED INK/MEDIA TRANSFORMS

(76) Inventor: Ioan Pop, 640 Oak Ridge Rd., Apt. 214, Hopkins, MN (US) 55305

( * ) Notice: Subject to any disclaimer, the term of this patent is extended or adjusted under 35 U.S.C. 154(b) by 1052 days.

(21) Appl. No.: 10/244,235

(22) Filed: Sep. 16, 2002

(65) Prior Publication Data
US 2003/0098986 A1 May 29, 2003

Related U.S. Application Data

(60) Provisional application No. 60/333,329, filed on Nov. 26, 2001.

(51) Int. Cl.
*H04N 1/60* (2006.01)
*H04N 1/00* (2006.01)
*H04N 1/034* (2006.01)

(52) U.S. Cl. .................. 358/1.9; 358/518; 358/520; 358/525; 358/501; 382/167; 345/601; 345/602; 345/590; 345/591; 345/593; 345/604; 345/603

(58) Field of Classification Search ............. 358/1.9, 358/518, 520, 525, 501; 382/167; 345/601, 345/602, 590, 591, 593, 604, 606
See application file for complete search history.

(56) References Cited

U.S. PATENT DOCUMENTS

| 4,500,919 A | 2/1985 | Schreiber |
| 5,339,176 A | 8/1994 | Smilansky et al. |
| 5,734,800 A | 3/1998 | Herbert et al. |
| 5,781,206 A | 7/1998 | Edge |
| 5,812,694 A * | 9/1998 | Mahy ..................... 382/162 |
| 6,067,406 A * | 5/2000 | Van Hoof et al. ........... 358/1.9 |
| 6,480,299 B1 * | 11/2002 | Drakopoulos et al. ....... 358/1.9 |
| 6,652,066 B2 * | 11/2003 | Teshigawara et al. ......... 347/41 |
| 6,724,500 B1 * | 4/2004 | Hains et al. ................. 358/1.9 |
| 7,032,508 B2 * | 4/2006 | Seymour ..................... 101/211 |
| 2002/0122589 A1 * | 9/2002 | Reiman et al. ............. 382/167 |
| 2003/0090685 A1 * | 5/2003 | Gardner et al. ............. 358/1.8 |
| 2005/0052666 A1 * | 3/2005 | Yamamoto et al. .......... 358/1.9 |
| 2005/0094169 A1 * | 5/2005 | Berns et al. ................. 358/1.9 |
| 2005/0094871 A1 * | 5/2005 | Berns et al. ................ 382/162 |

OTHER PUBLICATIONS

Linearization Curve Generation for CcMmYK Printing, Ying X. Noyes, et al., Conexant Systems, Inc., IS&T/SID Eighth Color Imaging Conference, pp. 247-251.

* cited by examiner

*Primary Examiner*—Aung S. Moe
*Assistant Examiner*—Beniyam Menberu
(74) *Attorney, Agent, or Firm*—Carmody & Torrance LLP

(57) ABSTRACT

The present invention is directed to an improved system and methodology for generating ink/media transforms. A preferred methodology comprises one or more of the following steps: selecting the ink type; selecting the color set; selecting the media type; selecting the ink saturation level; generating a set of "linearization" color samples, or "ramps"; measuring the linearization ramps; generating a set of "target" color samples, or "patches"; measuring the target patches; screening the target patches and generating the boundary surface of a printer's gamut; implementing an under-color removal (UCR) and black generation (BG); and building the Printer Profile, Transforms and ICC Color Profiles.

20 Claims, 13 Drawing Sheets
(10 of 13 Drawing Sheet(s) Filed in Color)

Figure 1 - CIElab Color Space

Figure 2 - Example Gamut Maps target patch values
interpolated values

Figure 3 - LUT Transform Matrix

Figure 5 - CMYK Color Ramps

Figure 6. Target Patches.

Figure 7 - Lightness (L) Screen.

Figure 8 - Chroma Screen.

Figure 9 - Hue Screening.

Figure 10 - Dark Patch Removal.

Figure 11. Tesselated Gamut Map.

Figure 12. Ink Media Gamut - Chroma.

METHOD FOR GENERATING CUSTOMIZED INK/MEDIA TRANSFORMS

RELATED APPLICATIONS

This application claims the benefit of U.S. Provisional Application No. 60/333,329, filed Nov. 26, 2001.

The present invention is generally directed to a color-management/color-correction system and methodology for enabling users to create custom ink/media color transforms using, for example and not limitation, up to eight (8) different process ink colors which may include multi-density process colors (e.g., C2M2YK, C3M3YKROGB) in a printer. The proposed methodology can be generalized for the building of n-different process ink color transforms. The present invention is also directed to a unique system and methodology for calibrating or fine-tuning pre-built ink/media transforms that are provided as part of a print server software, as well as a system and methodology for allowing end users to create the custom transforms. The present invention is also directed to providing the ability to view and manipulate a range of different image properties after a print job has been raster image-processed (or "ripped") by the print server in preparation for printing. Finally, the present invention is directed to a system and methodology that can be incorporated into an ICC color management workflow by providing for the creation of ICC profiles that can be uploaded to the end user's workstation.

BACKGROUND OF THE INVENTION

The basic problem of color management lies in translating a color as described by one device (source) for use by another device (target) that will reproduce it. The target device may or may not describe color in the same way as the source device.

For example, say an end user selects a certain color for an object within a graphics application. When the graphic image is produced on a printer, the selected color should match, as closely as possible, the original color. The source color is described by the graphics application as a set of values: for example, in L*a*b color space the selected color might be L=50, a=60, b=80, a shade of red. If the target device, the printer, described color in the same way, and had available that particular shade of red in its ink set, all would be well. A color correspondence, or match, between the source and target devices has been effected perfectly. The problem, of course, is that the printer is very unlikely to actually have the color of ink requested. Color printers generally rely on a very limited set of ink colors to reproduce images, most often four color inks (CMYK) but sometimes as many as twelve (C3M3YKROGB) or more color inks. Since the target device doesn't have ink that matches the specified color, it must attempt to reproduce the color using one or another combination of inks from the limited set of colors it has available.

Therein lies the problem of color management: How does the printer determine how much of each of the available colors of ink to use in reproducing the specific source color? This problem can be subdivided into two smaller, more manageable problems:

1) When known quantities of ink from the available ink set are printed together, what colors result? Characterizing the range of colors that are reproducible can solve this problem by the target device. The device characterization entails printing and measuring a large number of sample colors for each set of ink colors and type of media used. The large data set thus generated must be post-processed to reduce the data set overall and to improve the quality of the data in best representing the gamut; and 2) By knowing the colors that result from mixing the inks in various combinations, how can solve the reverse problem of determining how much of each ink to use for a specified source color? Developing a computational model that translates, or transforms, the description of the color can solve this problem by the source device into a description of the color for the target device, or printer.

To solve these problems, a color management system requires three components: a reference color space, device profiles, and a color-matching engine.

The reference color space is one of the CIE-defined models (CIEXYZ, CIELAB, etc.). The reference color space (FIG. 1) is a family of mathematical models that describe color in terms of the three primary constituents that describe normal human color vision.

A device profile is a representation of how the color produced by a particular device, be it a scanner (input device), monitor (display device), or printer (output device), deviates from a color norm. For example, to profile a scanner, we scan a printed target containing known CIE color values, then compare the RGB values produced by the scanner. The deviation between target values and actual values are then noted and saved in the device profile. The deviation values are then used to make adjustments.

The color-matching engine does the work of adjusting colors for specific devices so that the color produced is consistent with the color requested. The engine needs both a source profile and a target profile. The source profile is typically the profile of the monitor on which an image is created, or the scanner on which an image is captured. The target profile is that of the printer. The color-matching engine evaluates the device-specific colors generated by a source device (e.g., monitor or scanner), usually RGB values, to determine the reference color space values (e.g., CIElab), then converts those reference color values into the device-specific process colors (e.g., CMYK, C2M2YK, CMYKROGB) of the target device, or printer.

A chief obstacle in successful color conversion is the difference in device color gamut. A device color gamut is the range of colors that the device is able to produce (FIG. 2). To specify the process of translation of an image to the color gamut of a destination device one uses the concept of rendering intent. This concept specifies the color gamut-matching strategy. According to the ICC specifications there are four rendering intents: relative calorimetric matching, perceptual matching and saturation matching and absolute colorimetric matching. In relative calorimetric matching, colors that are common to both devices (i.e., an input device and an output device are rendered exactly, while colors that fall outside the gamut of the target device are adjusted (or mapped) to the next-closest equivalent. Relative Colorimetric rendering intent is suitable for precise color matching. In perceptual rendering intent, every color may be adjusted, while overall color relationships are preserved. This method is successful because the human eye is sensitive to detecting color relationships but is less sensitive to detecting absolute colors. In the case of Saturation rendering intent the colors are pushed towards the gamut boundary such that the maximum saturation has been achieved. This type of color matching is suitable for graphics presentation. In the case of the Absolute Colorimetric rendering intent the native white point of the source image is been preserved instead of mapping to D50 relative. The product of mapping from a device-independent color space (Profile Connection Space, i.e. CIELab, RGB) to a device-dependent color representation of a printer or scanner is called a transform. A transform is basically a look-up table (LUT) that contains a large data set, or matrix, of color values (FIG. 3) representing the gamut of the target device (i.e., its range of reproducible colors) as applied to the reference color space (e.g., CIElab) for a particular ink/media combination. The LUT includes a data set that represents the reference color space and the matrix of color values representing the target device gamut is organized in relation to it. FIG. 4 illustrates a 6×6×6 3D matrix of color values represented as an exploded color cube. Matrix color data that must be interpolated from measured target patch data is shown as gray faces on the mini-cubes.

In operation, a source color is specified by an input device (e.g., a graphics application) and transmitted to an output device (e.g. a server/printer) for rendering an image. The source color (e.g., RGB=100,0,0) is first converted to the reference color space and then applied to the transform LUT to convert it to the applicable output color value. If an exact match is found in the matrix of color values contained in the LUT, that value is used to render the color in the target device's color space. Specifically, this involves the selection of the percentages of ink available in the color set (e.g., CMYK) needed to most accurately reproduce the specified source color. If an exact match is not found in the transform LUT, a transform value is created for the requested source color. This is done by the target device's operating software, which performs an interpolation from the closest set of color values in the LUT to the specified source color to render the output color.

An ICC profile is a description of the color rendering abilities of a particular target device, or printer. The ICC profile defines the gamut, or color range, of a target device, as well as how the device distorts color. ICC profiles make it possible to describe the color reproduction capabilities of devices manufactured by countless different vendors in a standard, portable format.

When an ICC workflow is used, a graphics application (e.g., Adobe PhotoShop) sends color data to the target device (e.g., server/printer) in the form of color separations: one separation for each process color used. Since the ICC profiles of the various devices have ensured that all necessary color correction has been applied, the target device, such as a printer sold under Assignee's trademark Color-Mark, and in particular, Assignee's 8-color or 12-color printers, does not make any changes to the color data as it is processed to render a printed image.

Assignee's current state of the art printers create ICC profiles in the same manner as creating a transform. Both the transforms and ICC profiles may be created simultaneously, regardless of which type of color management the user prefers. An ICC profile may have a file extension of *.ICM, while another custom creatable transform may have an extension of *.CX. The end user incorporates generated ICC profiles into their ICC workflow by uploading the ICC files via an FTP link between the print server and their workstation.

Applicant has found that the state of the art has certain deficiencies, such as the fact that only a few graphics applications could use the ICC profiles created by the present assignee's state of the art system, sold under the trademark ColorMark+, especially with regard to extended process colors. This is because the ICC standard calls for the application to generate the color separations used by the target device (i.e., one separation for each process color used) and few graphics applications recognize more than four-color (CMYK) or six-color (CMYKRO) printers. In these cases, the user may be constrained to create images for printing using RGB color space and the transforms created by the present assignee's state of the art system, although the user could configure the desired printer, such as the present assignee's ColorMark+ printer, to use only 4-color or 6-color ink sets. Also, the ICC standard does not accommodate the use of spot colors: any spot color chosen in the application must be given its own color separation, which will not be understood by the system server.

Because ICC profiles are platform-independent (not to be confused with device-independent), some vendors have produced third-party software for creating ICC profiles of a given target device. The profile-creation process usually consists of printing a set of color samples for the target device, measuring the samples colormetrically, and then comparing the device's actual values with the desired values for the color samples. This approach for creating ICC profiles is less than desirable for two reasons. First, in order for profiling to work correctly, the device must produce its output without any additional color correction applied. However, for example, the print server marketed and sold under the trademark ColorSpan always applies color correction to printed output, except when ICC profiles have been selected. Second, even when using an ICC workflow, a corresponding custom transform must be selected on the server.

Therefore a new system and methodology for creating improved custom transforms is desired.

OBJECTS AND ADVANTAGES OF THE PRESENT INVENTION

Accordingly, it is an object of the present invention to provide an improved methodology to create custom ink/media transforms for printers.

Another object of the present invention is to permit the selection of any combination of supported inks for creating a custom ink/media transform (e.g., C2M3YKR).

Yet another object of the present invention is to provide predictable color matching that avoids conditions leading to creation of "hard dots" in light-tone areas for mapped colors.

Still another object of the present invention is to support a practical workflow for the generation of custom transforms based on a reasonable number of color samples per ink set, while still producing accurate color matching.

Another object of the present invention is to provide for smooth color and tone transitions throughout the target device's color space for each ink/media combination.

Yet another object of the present invention is to provide a range of user controls that can be applied to modify the output image (c.f., post-RIP processing) in meaningful and stable ways.

And still another object of the present invention is to provide for good neutral gray tones.

Further objects and advantages of this invention will become more apparent from a consideration of the drawings and ensuing description.

SUMMARY OF THE INVENTION

The present invention is directed to an improved system and methodology for generating ink/media transforms. A simplified flowchart setting forth a preferred methodology for carrying out the present invention is set forth in FIG. 13 and in the ensuing detailed description. Further details for carrying out the present invention are additionally illustrated in the accompanying figures.

Generally speaking, a method of generating an ink/media transform for a target device in accordance with the present invention comprises the steps of: selecting the ink type; selecting the color set; selecting the media type; selecting the ink saturation level; generating a set of linearization ramps; measuring the linearization ramps; generating a set of target patches; measuring the target patches; screening the target patches and generating the boundary surface of the gamut for the target device; implementing under-color removal and black generation; and building the transform. Further steps to more particularly carry out the invention are further set forth in the claims.

In one particular methodology, the generating of an ink/media transform for a target device in which an ink type, a color set media type and an ink saturation level have all been selected, a set of linearization ramps have been generated and measured, and a set of target patches have been generated and measured, may comprise the steps of: screening the set of target patches, wherein each generated patch has corresponding Lab values, wherein the step of screening each generated target patch comprises the steps of: (a) accepting a patch having a threshold lightness value (L) value for a preselected ink coverage value and discarding patches having an ink coverage value that is higher than the threshold lightness value (L); (b) accepting a patch having at least a threshold chroma value for a preselected ink coverage value and discarding patches having an ink coverage value that is higher than the threshold chroma value; (c) eliminating patches that contain an ink coverage amount that is inconsistent with the specified hue value; (d) identifying and discarding patches that satisfy the criterions of both containing 100% of a non-primary color and containing less than 100% of a non-primary ink that comprises the color; (e) identifying and discarding patches that satisfy the criterions of both containing 75% of the non-primary color and containing less than 75% of the non-primary ink that comprises the color; and (f) repeating steps (d) and (e) for all non-primary color ink levels of the color set; (g) eliminating patches with color values that include pure black ink; determining the in-gamut and out-of-gamut colors for the transform by using a 3-dimensional Delauney Tessellation, wherein each vertice corresponds to a coordinate point position of a target patch, and the final gamut boundary re-shaping method used in the profile building process; performing 3-dimensional interpolation from nearby vertices when transforming color values for colors that are not directly represented in the LUT data set; and building the transform includes the steps of: constructing a hypercube of dimensions 15×15×15 uniformly spaced points in the CIELab color space; creating a look-up table containing a transformation value for each of the selected color patch values by indexing the corresponding Lab values to corresponding coordinates in the color space; and implementing a baricentric interpolation and gamut-mapping procedure to fill out the transform LUT with a complete set of values.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE PREFERRED EMBODIMENTS

Figure 1:
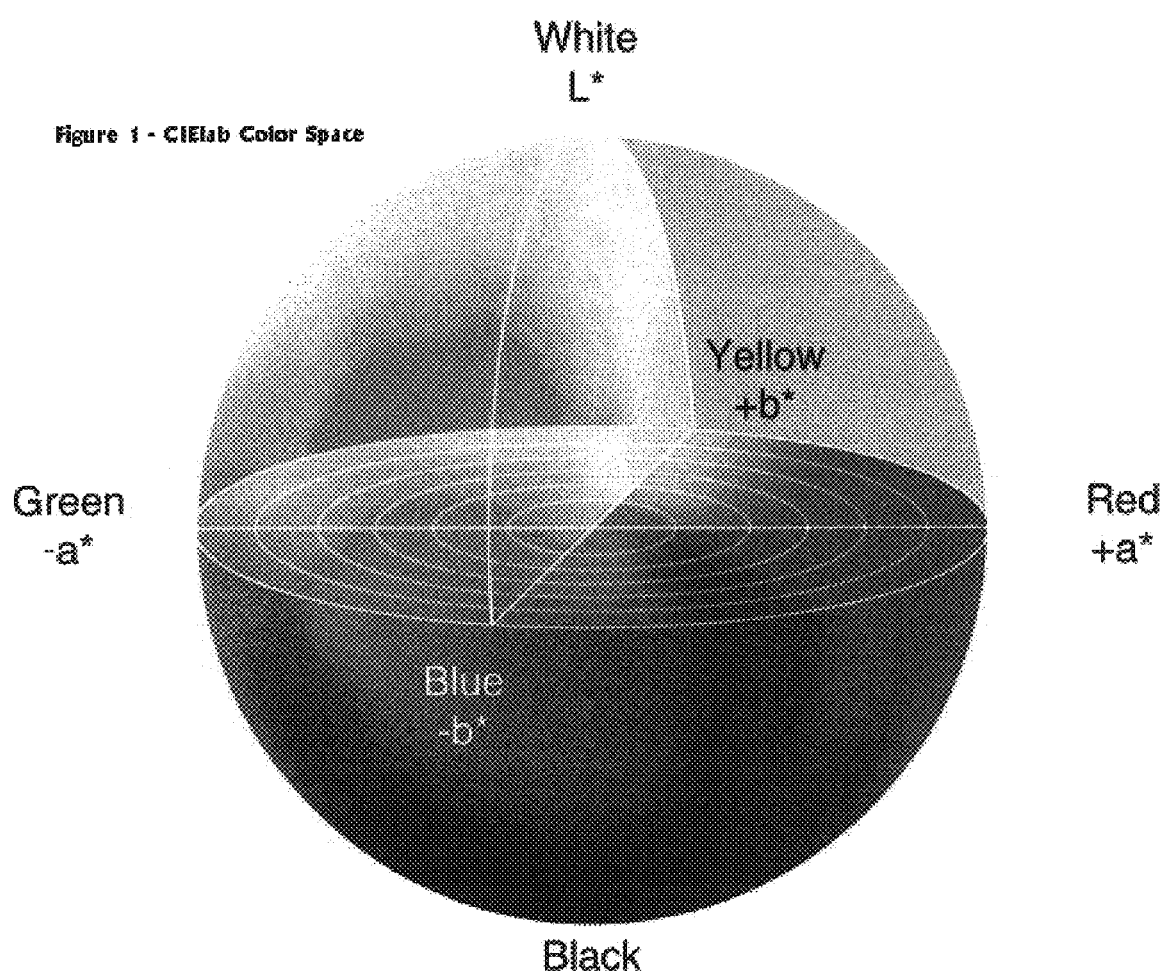
FIG. 1 is an exemplary reference color space to explain the present invention.
Figure 2:
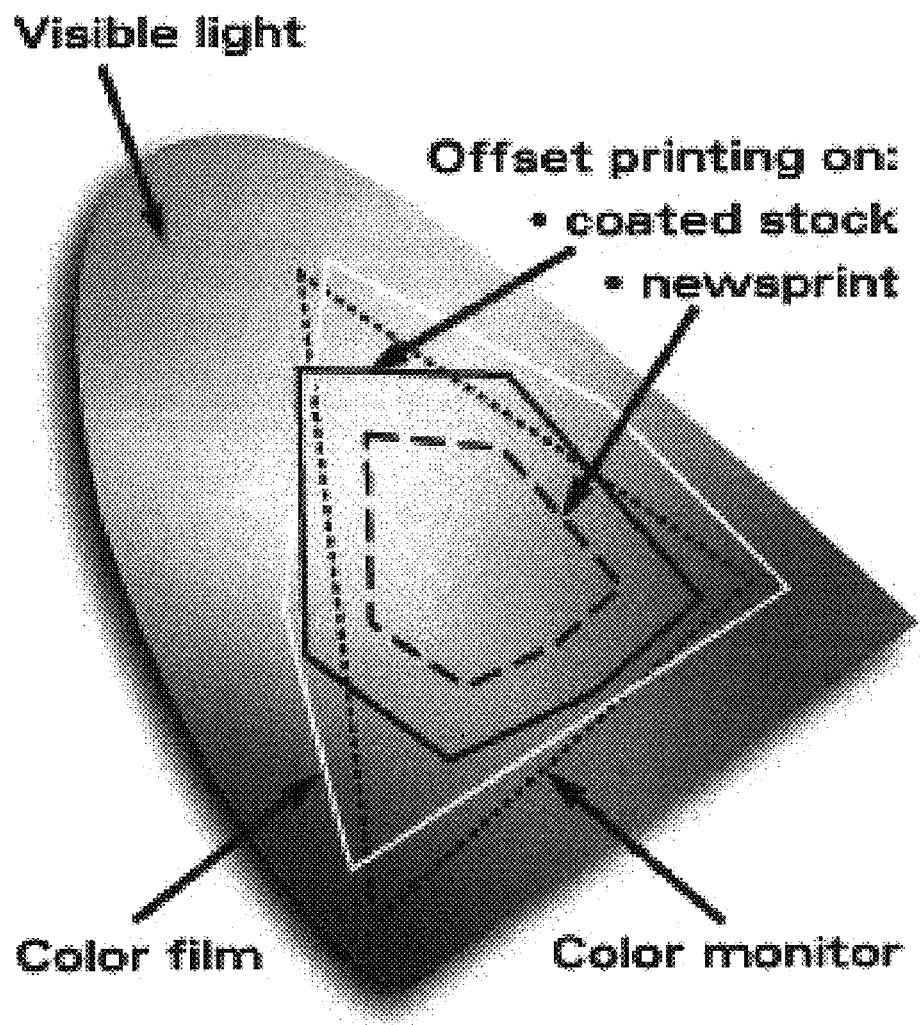
FIG. 2 is an exemplary color gamut.
Figure 3:
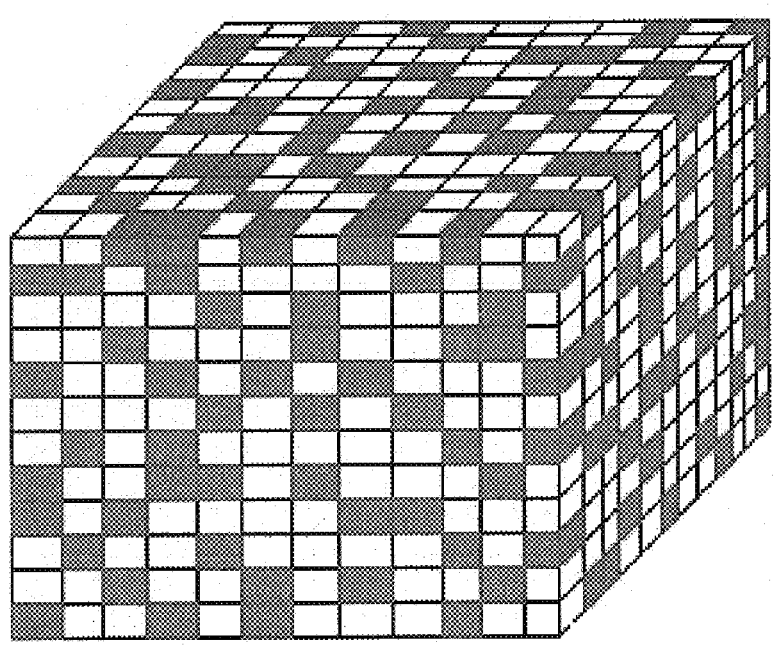
FIG. 3 is an exemplary look up table transform matrix.
Figure 4:
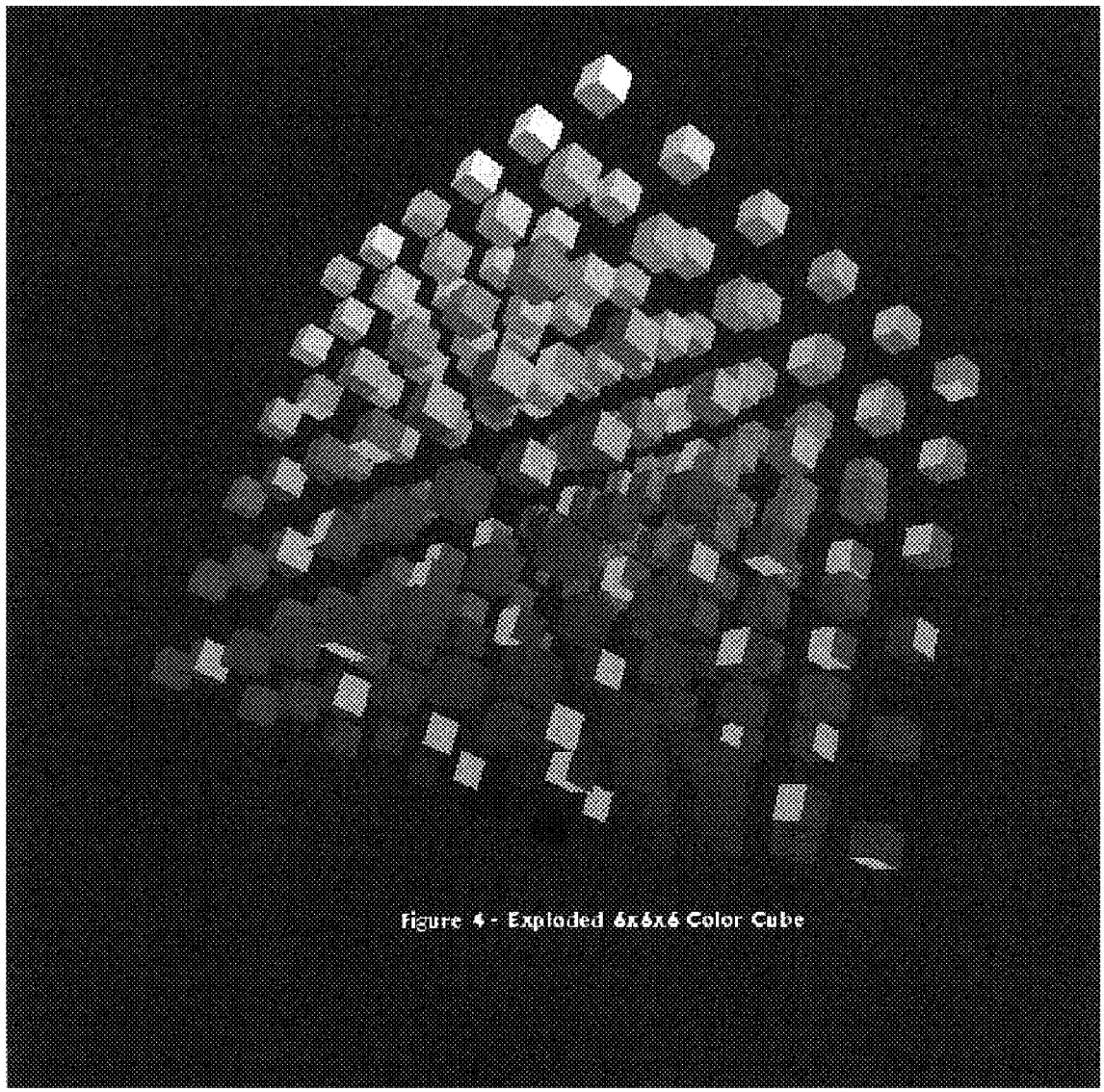
FIG. 4 illustrates a 6×6×6 3D matrix of color values represented as an exploded color cube.

Generally speaking, a preferred methodology for carrying out the present invention of creating customized ink/media transforms, comprises one or more of the following steps: selecting the ink type; selecting the color set; selecting the media type; selecting the ink saturation level; generating a set of "linearization" color samples, or "ramps"; measuring the linearization ramps; generating a set of "target" color samples, or "patches"; measuring the target patches; screening the target patches and generating the boundary surface of a printer's gamut; implementing an under-color removal (ICR) and black generation (BG); and building the Printer Profile, Transforms and ICC Color Profiles. Details of the foregoing steps, taken in connection with the details of the figures, will now be described.

Selection of the Ink Type (Step 10)

The ink type that will be used in creating the ink/media transform is chosen. Currently, the ink type selected can be for dye-based, pigment-based, or multi-density black process color inks.

Selection of the Color Set (Step 20)

The color set that will be used in creating the ink/media transform is then chosen. The color sets most readily available are 4-ink color set (CMYK), 6-ink color set (C2M2YK), 8-ink color set (CMYKROGB), and 12-ink color set (C3M3YKROGB). An arbitrary set of ink color combinations may be chosen for use with a media in creating a custom transform.

Once an arbitrary set of ink colors has been selected, the color set is examined to determine a set of primary inks to use. The traditional process color primaries are cyan, magenta and yellow (CMY). Black (K) ink is often added later to reduce ink usage in dark areas, and to extend the gamut in the dark region. However, in accordance with the present invention, use of the traditional CMY primaries is not required. In accordance with the present invention, the optimum set of primaries are selected for the ink set provided. For example, if the four inks chosen are red, orange, cyan and blue, the color engine will pick cyan as the cyan primary, red as the magenta primary, and orange as the yellow primary. There is no black ink and blue is the only non-primary color used.

Selection of the Media Type (Step 30)

A media type that will be used in creating the ink/media transform is chosen. There are a wide variety of potential media to choose from. These might include reflective media such as a coated photobase or vinyl, and transmissive media such as backlit film. It should also be noted that different media have different white points, reflection and ink absorption characteristics. This is why a separate transform is created for each ink/media combination used on the printer.

Selection of the Ink Saturation Level (Step 40)

An ink saturation level that will be used in creating the ink/media transform is chosen. This parameter is determined empirically for the chosen media. A set of coverage samples for each of the inks in the color set is printed with an increasing density, or saturation, of ink applied to produce a "ramp". The user chooses the optimum ink saturation for each color based on a number of visual criteria well known in the art. Too much ink can cause image artifacts such as bleeding, show-through, wrinkled surface texture and haze. Too little ink reduces the color gamut for the ink/media transform being created and can result in image reproduction with colors that look dull or faded. The ink saturation scale ranges from 0-400% coverage; however, the maximum ink level selected seldom exceeds an actual value of 250% coverage.

Generation and Measuring of the Linearization Ramps (Step 50)

Figure 5:
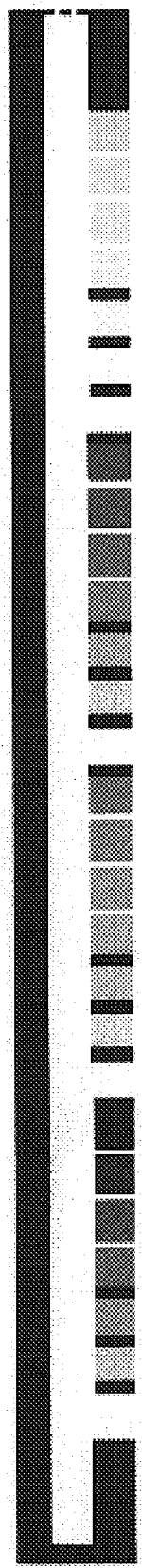
FIG. 5 is an exemplary set of density color samples.

Each ink color that will be used in creating the ink/media transform must be "linearized". To accomplish this, a small set of density color samples, or "ramps" (FIG. 5), is printed for each of the ink colors in the color set (usually 7 or 15 ink levels/ramp). The density color samples are printed in a sequence having increasing ink density or saturation—from nil density up to the maximum ink saturation level chosen in the previous step. Seven patches are printed for each ink color.

The primary objective of linearizing the ink colors is to determine the saturation levels that are compatible with the visual perception of the user. This is necessary because a given coverage of ink doesn't necessarily produce the perceived coverage. For example, a density color sample that has 30% coverage using yellow ink (i.e., 30% of the pixels locations have yellow dots) may only appear to show 10% coverage. Conversely, a density color sample that has 50% coverage of cyan ink may appear to show 70% coverage. A related objective is to create a uniform transition of color from a minimum to a maximum saturation for each ink color in the color set.

The linearization ramps are measured using a color measurement device. For some printers, the measurement device is an on-board CCD camera or photo-sensor, such as that described in U.S. application Ser. No. 09/260,925 filed Mar. 2, 1999, co-owned by the present assignee of the instant invention, and incorporated by reference as if fully set forth herein. Such a device reads and records the color data from the patches automatically. Earlier printers used an external color measurement device, often called a color calibrator. Some commonly used color measurement devices include the X-Rite DTP22 or DTP41/DTP41 A color calibrator, or the Greytag Spctroscan spectrophotometer.

Using either type of device, the "global" reflectance values (between 0.0 and 1.0) are taken for each of the pure color samples and a linearization is computed for each color.

Generation and Measuring of the "Target" Patches (Step 60)

Figure 6:
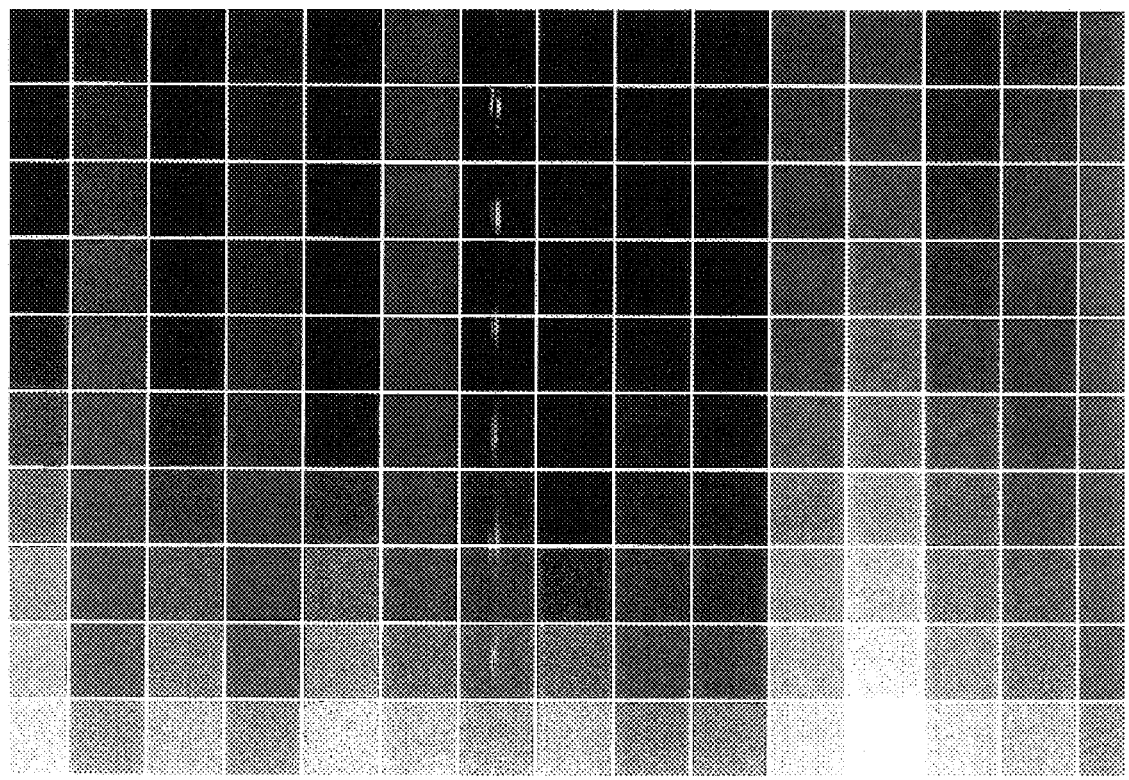
FIG. 6 is an exemplary set of "target" color samples.

Once the linearization ramps have been created, a large set of "target" color samples, or patches, is printed using both the "pure" ink colors for the chosen color set, as well as colors built from ink combinations (FIG. 6). The patches are printed across the range of producible colors to encompass the printer's color gamut (e.g., the range of reproducible colors for the device). The total number of target patches generated is a function of the chosen color set and ink-saturation level, as selected by the user. In all cases, however, the color engine, constructed in accordance with the present invention, generates many more target patches than are actually needed to generate an efficient transform. By "efficient" is meant that the selection of a set of color values adequately represents the volume and boundaries of the printer's gamut (as represented within CIELab color space) for the given ink/media combination. At the same time, the color values are selected to occupy an even distribution of points throughout the color space, thus ensuring that the colors adhere to an acceptable a gray balance and to ensure that interpolated values used to complete the data set are accurate.

The target color samples are measured using the on-board CCD camera, or an external color measurement device (as described above). The CIElab values for each of the color samples is taken and stored in a working file for post-processing by the color engine.

The primary objective in measuring the target patches and generating a data set of CIElab values is to render (or "build") a color gamut that represents the operational limits of the printer for the ink/media combination being used. A subset of target patches will be selected, or "screened", that will best represent the volume and surface boundaries of the ink/media gamut in CIELab color space. Hence, not all the color samples printed will be used in generating an ink/media color transform.

Selection Criteria For the Gamut Boundary Generation (Step 70)

In accordance with the present invention, an initial set of target patches is then created. Usually not all the patches are used in the process of building the transform. The trick is to reduce the data set and still produce an accurate, efficient representation of the printer's gamut for that ink/media combination. This is the key to producing a good transform. The subset is chosen to provide a data set of likely candidates that will represent every region of the printer's gamut no matter what the characteristics of the ink and media might be. For example, many patches may have Lab values that are very close to each other, but have been produced using entirely different ink combinations. Leaving these conflicting color values in the final transform will produce irregular or uneven color transitions in printed output. In areas near the neutral axis, especially in the lighter neutrals, selection of primary colors (CMY) should take precedence over non-primary colors to ensure that reproducible colors are fully captured by the gamut. In dark areas of the gamut, black ink must be introduced evenly as colors get progressively darker, while other colors of ink are reduced commensurately. In all areas, the transform must produce smooth transitions between similar colors to produce pleasing results in the printed image.

The key to accurate colors and smooth transitions in the printed output is to remove the color data for target patches that don't fit.

This is important in employing the final transform to produce accurate color conversions for interpolated color values; that is, when creating values to complete the LUT data set by interpolating from known values. This is also important when considering the wide range of variation in color values that represent different ink/media combinations. For example, a media such as vinyl has a small gamut when compared to a photobase gloss coated paper. A dark color printed on vinyl might have an L value of 40, while a similar color printed on photobase gloss paper might have an L value of 4. Obviously, it becomes quite important to select a data set that is representative of the printer's color gamut as it applies to the ink/media combination being used. To further complicate matters, on different types of media 100% coverage of black ink may have a much larger or a much smaller L value than other dark ink combinations. Accordingly, a set of screening filters is employed to select a subset of color patches that accomplish this goal.

Figure 7:
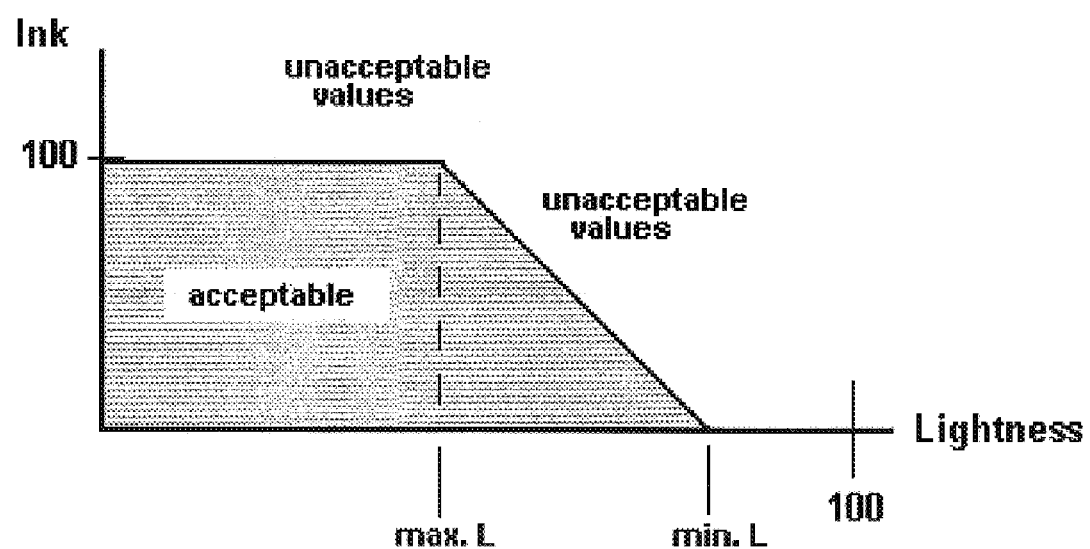
FIG. 7 illustrates lightness values plotted for varying ink coverages.

An L-value screen process is applied to both the primary (CMY) and non-primary (ROGB) colors (FIG. 7). The objectives here are to eliminate "hard dots" in the lighter color areas, to produce good neutral tones, and to ensure good contrast in the lighter ink colors. The first step of the process consists in the adjustment of the neutral axis, by shifting the white and the darkest patch (lowest L point) such that the neutral axis will be along the direction of L. This is a result of converting the Lab values for the patches to CIEXYZ values and subsequently resetting them to back to CIELab values. Using this procedure one conserves the neutrality of the black-white axis and achieving a good contrast in the bright region (large L region of the CIELAB color space).

Figure 8:
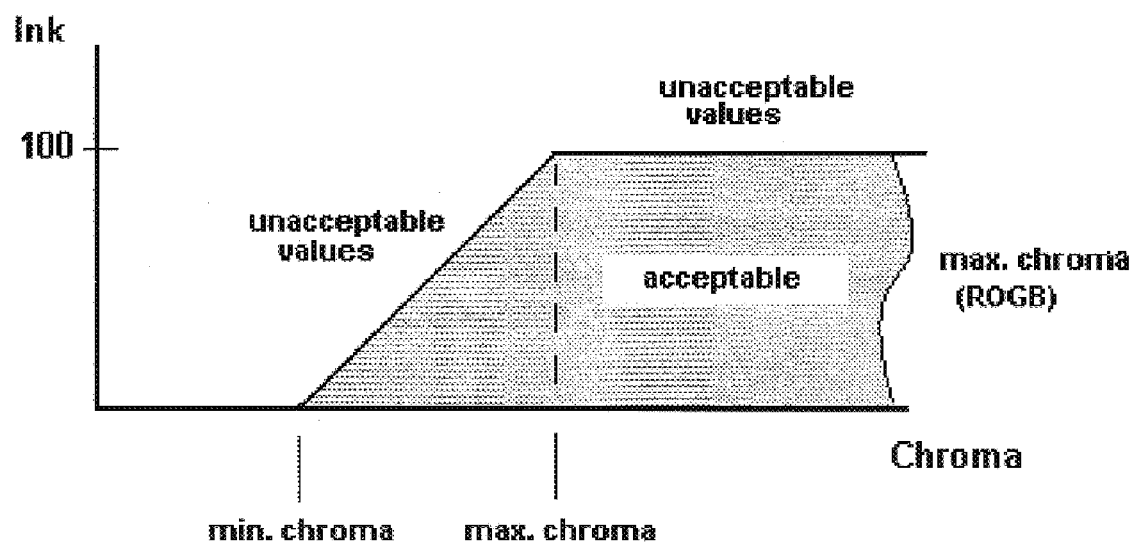
FIG. 8 illustrates chroma values plotted for varying ink coverages.

Next, a chroma screen is applied only to non-primary (ROBG) colors (FIG. 8). The purpose of this screen is to ensure that only primary colors are used near the neutral areas of the gamut; that is, it is not preferable to use non-primary inks to reproduce colors where primary inks will suffice because non-primary inks are needed to extend the gamut volume. The core of the gamut is where the primaries alone are used, with CMY colors residing at the top and middle of the gamut and black gradually filling in at the bottom. Non-primaries are restricted to the outside portions of the gamut, in the area surrounding the core, adding additional gamut volume and surface area near their respective natural hues. The chroma screen helps to ensure that the non-primary colors are used mostly at the outer boundaries of the gamut, less often in the middle areas, very little near the gamut core, and not at all within the core itself where the primary colors are dominant. Any color patches with values that violate these criteria are discarded.

Figure 9:
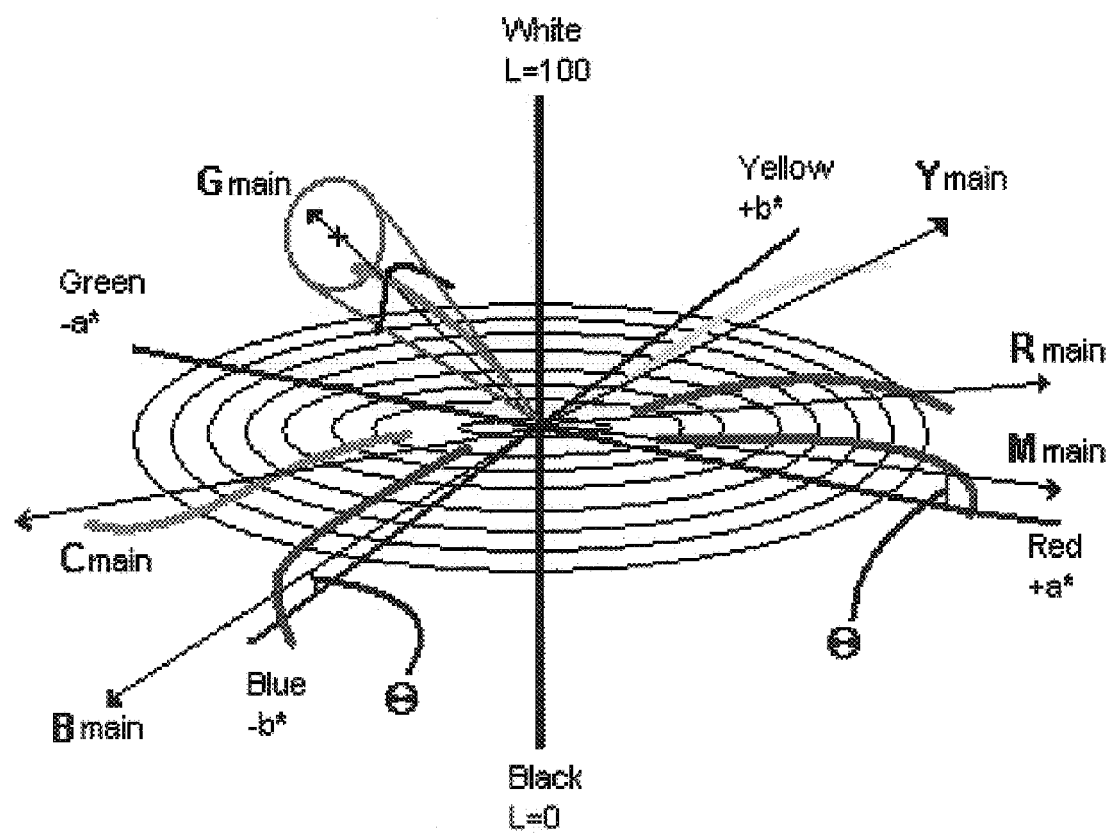
FIG. 9 illustrates hue values plotted for varying ink coverages.

The next step is to apply a hue screen, again only to non-primary (ROGB) colors (FIG. 9). The hue screen eliminates color patches having a hue that is inconsistent with the specified hue for that particular color process, and thus might skew the final transform. For example, a patch with a red hue that contains 100% green ink is discarded (these hues occupy diametrical positions along the red-green hue axis in CIElab color space).

Shell screening is the key to selecting those target patches that will contribute to the final data set and those that won't. It is applied only to the non-primary (ROGB) colors. Target patches are generated with non-primary (ROGB) consist of a mixture with primary colors (CMY not black (K)) and receive for example, 25%, 50%, 75% and 100% ink levels. A first order selection is made using for patches that contain 100% of the non-primary color. Obviously, this will generate a tiny gamut. However, any target patch whose color values fall within this small gamut and which contains less than 100% of the non-primary ink will be discarded. A second order selection is made for patches that contain 75% of the non-primary ink. The gamut areas is now somewhat larger, but again any target patch whose color values fall within the gamut and which contain less than 75% of the non-primary ink will be discarded. This process is repeated for all non-primary color ink levels of the color set. Once it is complete, many aliases (the same color patch with different ink combinations) will be removed and the remaining data set will be "regularized" to provide smooth transitions into and out of the non-primary areas of the gamut.

Figure 10:
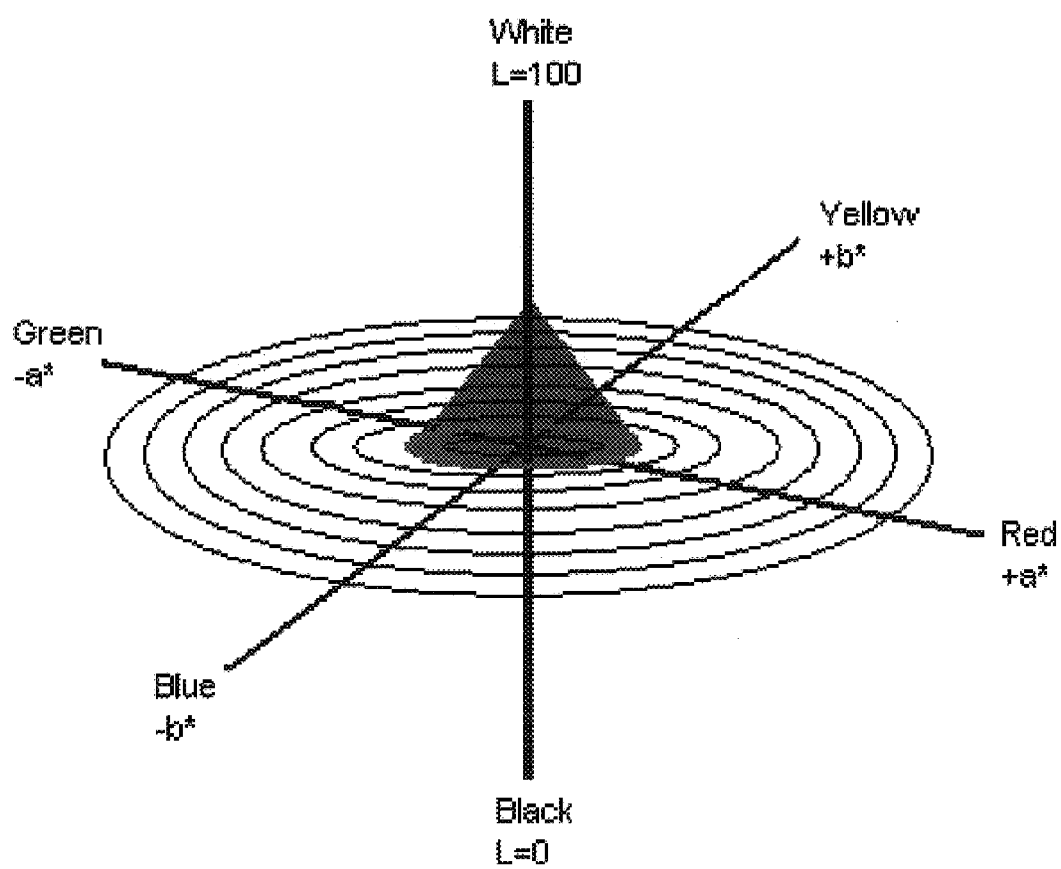
FIG. 10 illustrates varying ink coverages used in connection with the methodology of the present invention.

The next screen is the dark patch removal (FIG. 10) and is applied only to the primary (CMY) colors. The first part of this screening process is accomplished by eliminating patches with color values that include a non-zero value for K (black) ink only (pure black patches). The last part of the dark patch removal process is the discard of the CMYK patches that have large chroma value. Only the CMYK patches having minimum chroma and separated by at least ΔE=2 apart are been used in the transform building process.

Rendering the Gamut (Step 80)

As stated previously, the primary objective in measuring the target patches and generating a CIELab data set is to render (or "build") a color gamut that represents the operational limits of the printer for the ink/media combination being used. A preferred carriage assembly for an ink jet print engine that may be used with such a printer is described in U.S. Pat. No. 6,290,332 and incorporated by reference as if fully set forth herein.

Consequently, once the target patches have been screened and the data reduced to a subset that best represents the volume and surface boundaries of the ink/media gamut in CIELab color space, the data set is adjusted, or shifted, to achieve a good perceptual uniformity with respect to the color appearance. This is accomplished by implementing the rendering intent, which by default is selected for perceptual rendering intent (see below). For each of the various rendering intents described below, with the exception of absolute calorimetric rendering, the white point of the paper (or of a white target of the printer engine) and the black point are shifted to match the L-axis of Lab color space (L-0 =black; L-100=white). The Lab values for the final data set are converted to XYZ color space and back again to CIELab color space.

There are four types of rendering intent considered in the profile building process, namely:

Perceptual—renders the closet possible perceptual color match while preserving subtle color relationships by compressing the entire gamut and shifting all colors into the printable region. This option is used to print color photographic images.

Saturation—maintains the original image color saturation when making the gamut-to-gamut conversion into the target color space. This option is primarily used to reproduce charts, graphs and business images.

Relative Colorimetric—remaps out-of-gamut colors to the closest reproducible color of the target device, or printer, without affecting the other in-gamut colors. This option can cause two colors in the source color space to merge into the same color in the device color space.

Absolute Colorimetric—remaps colors identically without making adjustment for the white point or black point that would affect image brightness.

Next, to determine the gamut boundaries of the printer for the selected ink/media combination, a computational geometry is needed to render the target patch data (CIElab values) as a 3D model within CIElab color space. This model will allow us to determine the in-gamut and out-of-gamut colors for the printer for the ink/media combination.

Figure 11:
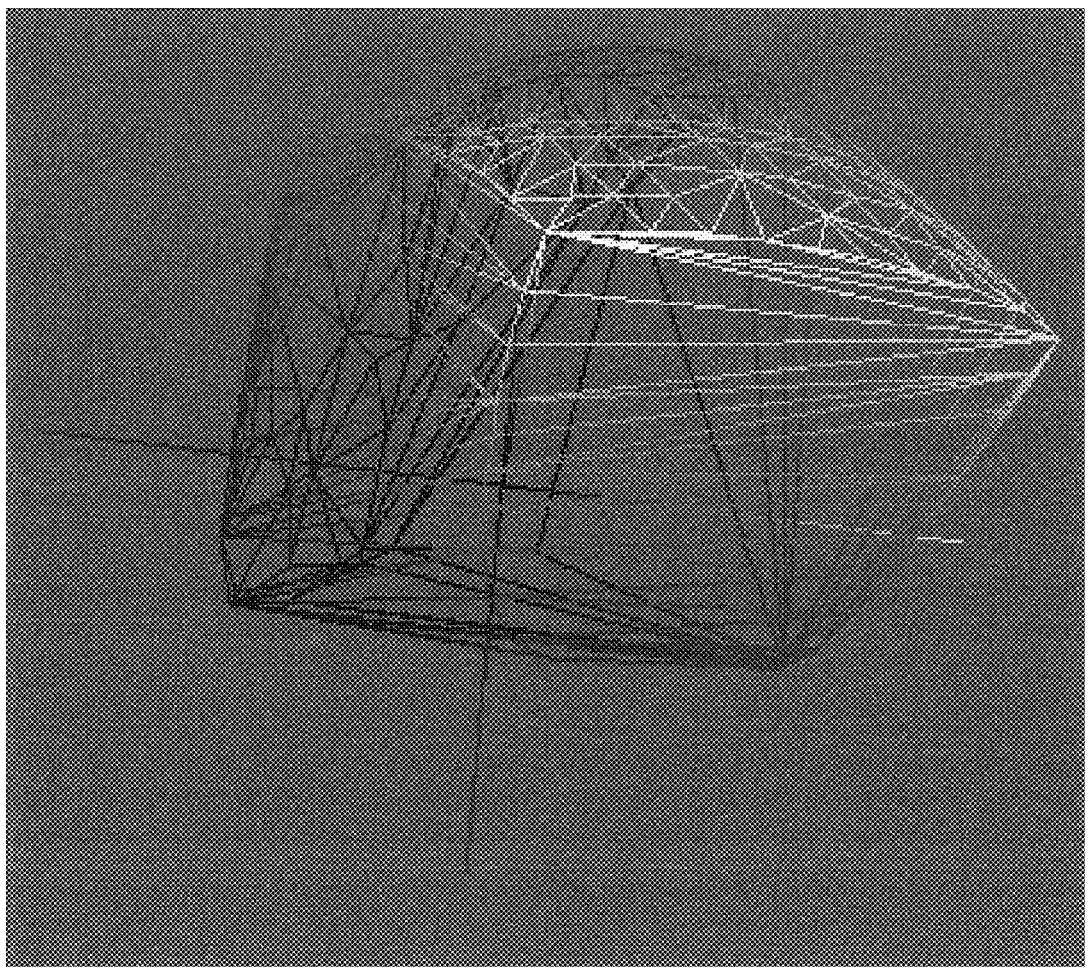
FIG. 11 is an exemplary gamut map.

Preferably, a convex hull generator is used to create the model. The 4-dimensional convex hull generator produces a 3-dimensional Delauney Tessellation (see FIG. 11) that produces a space filled with tetrahedra, wherein each vertex corresponds to a coordinate point position of the color data set and representing a target patch.

Since in general the natural color gamut boundaries of a printer are not convex, we use a final boundary procedure to re-shape the convex gamut boundary generated by the 3-dimensional Delauney Tessellation procedure. Our final boundary reshaping method generates a new boundary, which is closer to the natural gamut boundary surface of the printer. This closed new boundary surface of the gamut is in general concave.

This model provides for easy tri-linear (3-dimensional) interpolation from nearby vertices when transforming color values for colors that are not directly represented in the LUT data set. It also helps to ensure that similar colors will reside nearby one another in the color space model.

Implementation of Under-Color Removal (UCR) and Black Generation (Step 90)

UCR/GCR are black generation (BG) functions that control how much black ink is used to produce non-neutral colors. By default, the color engine adds black ink only in the very dark (shadow) region of the color gamut. The actual range of L-values for this region are ink/media dependent. The color engine provides the user with controls that allow adjusting the GCR/UCR values of the rendered image as desired. We also use a smoothing curve to achieve a smooth transition in the dark region along any direction (ray) of the CIELab color space, without losing details of the shadow region.

Building the Printer Profile, Transforms and ICC Color Profiles (Step 100)

The final number of target patches used to build the transform LUT is actually small by comparison with the number of target patches read. For straight CMY process colors, an efficient and accurate transform requires color values from around 180 patches. For multiple color transforms, a few more patches per non-primary color are required, but the total number remains in the 200-300 range, even for n-color transforms. As non-primary color patches are selected for inclusion in the final data set, CMY patches are removed, keeping the total number low. This does not imply that a set of 300 target patches may be pre-selected, printed and measured to obtain the same result. The entire range of target patches must be printed and the screening methods just described must be applied to select the best data set for the chosen ink/media combination.

Figure 12:
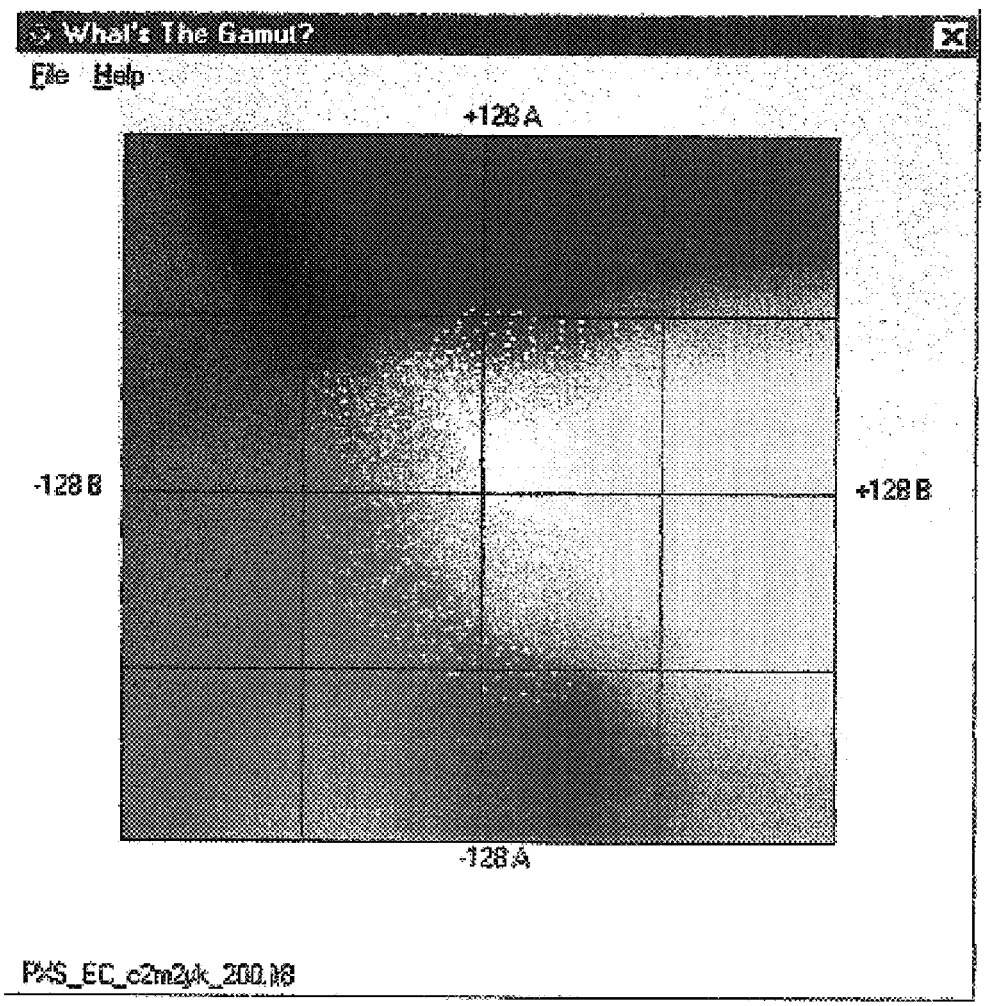
FIG. 12 is another exemplary gamut map.
Figure 13:
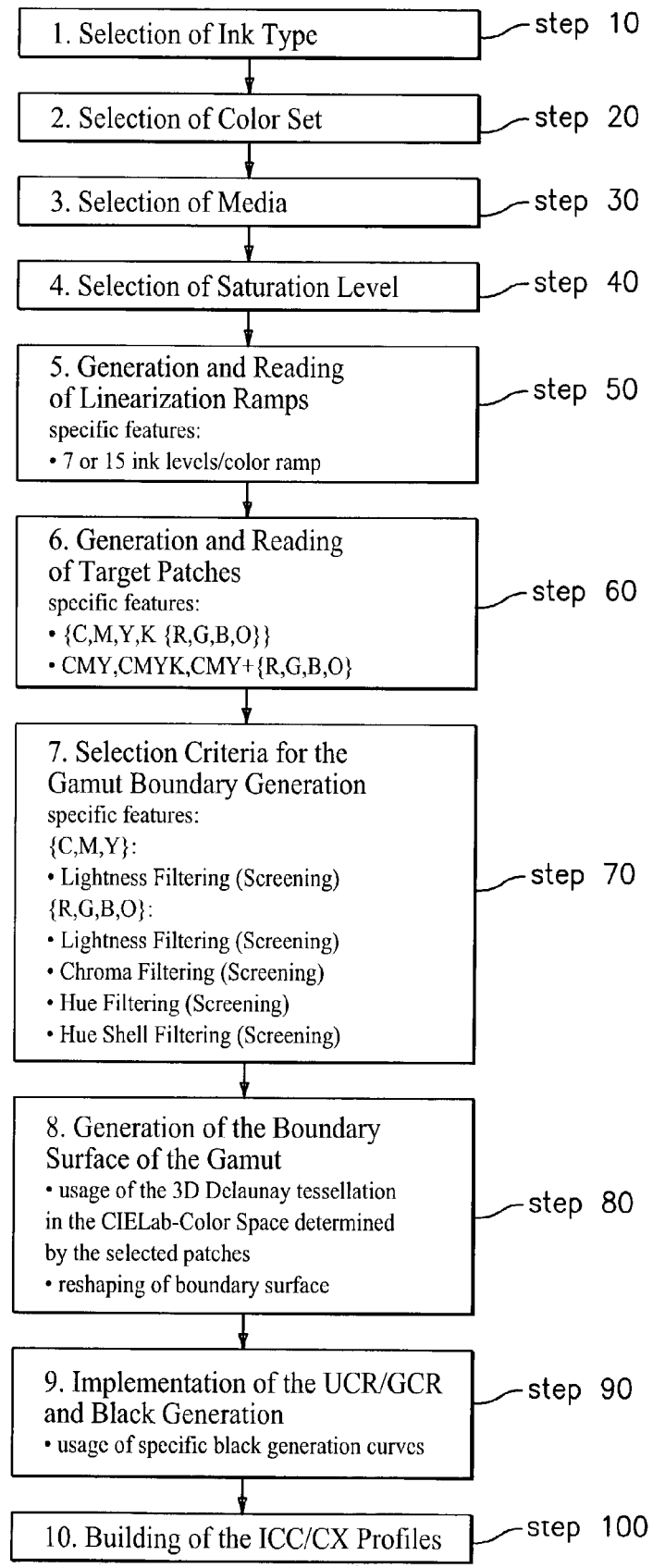
FIG. 13 is a flowchart illustrating the methodology of a preferred embodiment of the present invention.

The final data set contains all of the CIElab values for the selected target patches that are used to construct the transform LUT. This data is then indexed to coordinates in the reference color space (CIELab). That is, each entry point in the LUT is also a coordinate point in the reference color space (see FIG. 12). In most cases, any given source color value (i.e. a color we are trying to match in the printed output) will not have a direct correspondence the entry points in the LUT (coordinate points in the reference color space). Instead, the source color's coordinates will lie between points in the LUT and a calculation must be performed to identify its actual location. In these cases, a tri-linear interpolation is performed to find the coordinate location from the coordinate values of surrounding LUT entries. Interpolation is preferably used in order to keep the size of the LUT reasonably small: if all source colors were directly represented in a 3-dimensional LUT, the LUT would need to contain $2^{24}$ entries.

Conversion from the CIELab color space to a device color space (e.g., CMYK, C2M2YK, C3M3YK, or C3M3YKROGB) is performed in two stages:

The first stage is to construct a hypercube of dimensions 15×15×15 uniformly spaced points in the CIELab color space (the limits of CIELab space being (0<=L<=100, −128<=a<=127, −128<=b<=127). Next, create a look-up table (LUT) containing a transformation value for each of the selected color patch values by indexing the corresponding Lab values to corresponding coordinates in the color space (e.g., 3–>8 [or 4,6,7, depending on the dimension of the color set previously chosen]). Finally, implement a baricentric interpolation and gamut-mapping procedure to fill out the transform LUT with a complete set of values. From this data, the ICC profile (*.ICM) is created.

Second, extend the 15×15×15 hypercube to a 100×100×100 hypercube to create the printer's transform file (*.CX). This is accomplished using a tri-linear interpolation method, wherein a color point is found from the vertices of a tetrahedron that falls within the color space tessellation.

Creating a cube the size of the ICC cube and then scaling it up linearly to the CX file size provides the best correspondence between an ICC profile and a transform LUT, especially when printing color ramps using the *.CX file. So we generate the ICC cube first. For each Lab points within the ICC cube, we attempt to interpolate the ink values from the tessellation. For Lab points outside the tessellation, we use a gamut-mapping algorithm. The gamut-mapping algorithm attempts to locate a position on the gamut edge that is at the same hue angle and provides the "most appropriate" result. Once all the data points have been filled in, then we are able to write out the ICC file. It is this file that gets uploaded by the user to the workstation. Afterwards, we can scale up the ICC cube to the size needed for the transform LUT and write that out as a *.CX file for use by the printer.

It can thus be seen that, among other things, the present invention provides an improved methodology and system for creating custom ink/media transforms for printers, permits the selection of any combination of supported inks for creating a custom ink/media transform, provides predictable color matching that avoids conditions leading to creation of "hard dots" in light-tone areas for mapped colors, supports a practical workflow for the generation of custom transforms based on a reasonable number of color samples per ink set, while still producing accurate color matching, provides for smooth color and tone transitions throughout the target device's color space for each ink/media combination, provides a range of user controllable options that can be applied to modify the output image (c.f., post-RIP processing) in meaningful and stable ways, and provides for good neutral gray tones.

From the foregoing disclosure, it will be appreciated that the present invention is an enhancement to the print server software and system currently used and marketed under the ColorSpan® trademark. While it will be appreciated that the present invention is widely applicable and implementable, to best appreciate the present invention, it is preferable to be used in combination with one or more of the following hardware platforms, namely the ColorMark Pro 1.5G, RIPStation 1G; ColorMark Pro 1G/8000, RIPStation 700/800; ColorMark Pro 7000/5000, RIPStation 500 or ColorMark Pro 4000, RIPStation 400. Furthermore, use of the present invention with one or more of the following external devices is preferred, namely, GretagMacbeth Spectrolino spectrophotometer and SpectroScan x/y table; X-Rite DTP41 or DTP41T auto-scanning spectrophotometer, the onboard CCD camera on the ColorSpan DisplayMaker® Esprit and DisplayMaker Series XII printers; and the ColorMark Calibrator. Lastly, profiles using the present invention are preferably created on one or more of the following printers, namely the DisplayMaker Mach 12; the DisplayMaker Series XII; the DisplayMaker Esprit and the DisplayMaker FabriJet XII.

It will thus be seen that the objects set forth above, among those made apparent from the preceding description, are efficiently attained and, since certain changes may be made in the above methodology and system without departing from the spirit and scope of the invention, it is intended that all matter contained in the above description or shown in the accompanying drawings shall be interpreted as illustrative and not in a limiting sense.

What is claimed is:

1. A method of generating an ink/media transform for a target device, comprising the steps of:
   selecting an ink type;
   selecting a color set;
   selecting a media type;
   selecting an ink saturation level;
   generating a set of linearization ramps;
   measuring the linearization ramps;
   generating a set of target patches, wherein each generated patch has corresponding Lab values;
   measuring the target patches;
   screening the measured target patches and generating a boundary surface of a gamut for the target device, wherein the step of screening each target patch comprises the steps of:
      accepting a patch having a threshold maximum lightness value (L) value for a preselected ink coverage value and discarding patches having an ink coverage value that is higher than the threshold maximum lightness value (L);
   implementing under-color removal and black generation; and
   building the transform.

2. The method as claimed in claim 1, including the step of:
   converting the Lab values for each patch to CIEXYZ values, and subsequently resetting them to back to CIELab values.

3. The method as claimed in claim 1, including the step of eliminating patches that contain an ink coverage amount that is inconsistent with a specified hue value.

4. The method as claimed in claim 3, including the steps of:
   (a) identifying and discarding patches that satisfy criterions of both containing 100% of a non-primary color and containing less than 100% of a non-primary ink that comprises the color;
   (b) identifying and discarding patches tat satisfy criterions of both containing 75% of the non-primary color and containing less than 75% of the non-primary ink that comprises the color; and
   repeating steps (a) and (b) for all non-primary color ink levels of the color set.

5. The method as claimed in claim 1, including the steps of:
   (a) identifying and discarding patches that satisfy criterions of both containing 100% of a non-primary color and containing less than 100% of a non-primary ink that comprises the color;
   (b) identifying and discarding patches that satisfy criterions of both containing 75% of the non-primary color and containing less than 75% of the non-primary ink that comprises the color; and
   repeating steps (a) and (b) for all non-primary color ink levels of the color set.

6. The method as claimed in claim 5 including the steps of:
   eliminating patches with color values that include pure black ink.

7. The method as claimed in claim 1, wherein the step of screening each generated target patch comprises the steps of:
   accepting a patch having at least a threshold chroma value for a preselected ink coverage value and discarding patches having an ink coverage value that is higher than the threshold chroma value.

8. A method of generating an ink/media transform for a target device in which an ink type, a color set media type and an ink saturation level have all been selected, a set of linearization ramps have been generated and measured, and a set of target patches have been generated and measured, the method comprising the steps of:
   screening the set of target patches, wherein each generated patch has corresponding Lab values, wherein the step of screening each generated target patch comprises the steps of:
      (a) accepting a patch having a threshold maximum lightness value (L) value for a preselected ink coverage value and discarding patches having an ink coverage value that is higher than the threshold maximum lightness value (L);
      (b) accepting a patch having at least a threshold maximum chroma value for a preselected ink coverage value and discarding patches having an ink coverage value that is higher than the threshold maximum chroma value;
      (c) eliminating patches that contain an ink coverage amount that is inconsistent with a specified hue value;
      (d) identifying and discarding patches that satisfy criterions of both containing 100% of a non-primary color and containing less than 100% of a non-primary ink that comprises the color;
      (e) identifying and discarding patches that satisfy criterions of both containing 75% of the non-primary color and containing less than 75% of the non-primary ink that comprises the color; and
      (f) repeating steps (d) and (e) for all non-primary color ink levels of the color set;
      (g) eliminating patches with color values that include pure black ink;
   determining in-gamut and out-of-gamut colors for the transform by using a 3-dimensional Delauney Tessellation, wherein each vertice corresponds to a coordinate point position of a target patch, and a final gamut boundary re-shaping method used in a profile building process;
   performing 3-dimensional interpolation from nearby vertices when transforming color values for colors that are not directly represented in the LUT data set; and
   building the transform includes the steps of:
      constructing a hypercube of dimensions 15×15×15 uniformly spaced points in a CIELab color space;
      creating a look-up table containing a transformation value for each of the selected color patch values by indexing the corresponding Lab values to corresponding coordinates in the color space;
      implementing a baricentric interpolation and gamut-mapping procedure to fill out the transform LUT with a complete set of values.

9. The method as claimed in claim 8, including the step of extending the 15×15×15 hypercube to a 100×100×100 hypercube to create a transform file by using a tri-linear interpolation wherein a color point is found from vertices of a tetrahedron that fall within a color space tessellation.

10. The method as claimed in claim 9, including the step of interpolating the ink values from the tessellation by using a gamut-mapping algorithm for Lab points outside the tessellation, in which a gamut-mapping algorithm attempts to locate a position on the gamut edge that is at a same hue angle and provides a desired result.

11. A method of generating an ink/media transform for a target device, comprising the stops of:
selecting an ink type;
selecting a color set;
selecting a media type;
selecting an ink saturation level;
generating a set of linearization ramps;
measuring the linearization ramps;
generating a set of target patches;
measuring the target patches;
screening the measured target patches and generating a boundary surface of a gamut for the target device, wherein the step of screening each generated target patch comprises the steps of accepting a patch having at least a threshold maximum chroma value for a preselected ink coverage value and discarding patches having an ink coverage value that is higher than the threshold maximum chroma value;
implementing under-color removal and black generation; and
building the transform.

12. The method as claimed in claim 11, including the step of eliminating patches that contain an ink coverage amount that is inconsistent with a specified hue value.

13. The method as claimed in claim 11, including the steps of:
(a) identifying and discarding patches tat satisfy criterions of both containing 100% of a non-primary color and containing less than 100% of a non-primary ink that comprises the color;
(b) identifying and discarding patches that satisfy criterions of both containing 75% of the non-primary color and containing less than 75% of the non-primary ink that comprises the color; and
repeating steps (a) and (b) for all non-primary color ink levels of the color set.

14. A method of generating an ink/media transform for a target device, comprising the steps of:
selecting an ink type;
selecting a color set;
selecting a media type;
selecting an ink saturation level;
generating a set of linearization ramps;
measuring the linearization ramps;
generating a set of target patches;
measuring the target patches;
screening the target patches and generating a boundary surface of a gamut for the target device, and determining in-gamut and out-of-gamut colors for the transform by using a 3-dimensional Delauney Tessellation, wherein each vertice corresponds to a coordinate point position of a target patch;
implementing under-color removal and black generation; and
building the transform.

15. The method as claimed in claim 14, including the step of performing 3-dimensional interpolation from nearby vertices when transforming color values for colors that are not directly represented in a LUT data set.

16. A method of generating an ink/media transform for a target device, comprising the steps of:
selecting an ink type;
selecting a color set;
selecting a media type;
selecting an ink saturation level;
generating a set of linearization ramps;
measuring the linearization ramps;
generating a set of target patches, wherein each generated patch has corresponding Lab values;
measuring the target patches;
screening the target patches and generating a boundary surface of a gamut for the target device;
implementing under-color removal and black generation; and
building the transform, including the steps of:
constructing a hypercube of dimensions 15×15×15 uniformly spaced points in the CIELab color space;
creating a look-up table containing a transformation value for each of the selected color patch values by indexing the corresponding Lab values to corresponding coordinates in the color space; and
implementing a baricentric interpolation and gamut-mapping procedure to fill out the transform LUT with a complete set of values.

17. The method as claimed in claim 16, including the step of:
extending the 15×15×15 hypercube to a 100×100×100 hypercube to create a transform file using a tri-linear interpolation wherein a color point is found from vertices of a tetrahedron that fall within a color space tessellation.

18. The method as claimed in claim 17, including the steps of providing correspondence between an ICC profile and a custom transform by creating a cube the size of the ICC cube and then scaling it up linearly.

19. The method as claimed in claim 18, including the step of interpolating the ink values from the color space tessellation by using a gamut-mapping algorithm for Lab points outside the tessellation, in which the gamut-mapping algorithm attempts to locate a position on the gamut edge that is at a same hue angle and provides a desired result.

20. The method as claimed in claim 17, including the steps of providing correspondence between an ICC profile and a custom transform by creating a cube the size of the ICC cube and then scaling it up linearly.

* * * * *